United States Patent

Bosma et al.

(10) Patent No.: US 9,332,726 B2
(45) Date of Patent: May 10, 2016

(54) MILKING SYSTEM, AND A METHOD FOR OPERATING A MILKING SYSTEM

(75) Inventors: Epke Bosma, Schettens (NL); Staffan Persson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 344 days.

(21) Appl. No.: 13/881,740

(22) PCT Filed: Nov. 11, 2011

(86) PCT No.: PCT/SE2011/051358
§ 371 (c)(1),
(2), (4) Date: Apr. 26, 2013

(87) PCT Pub. No.: WO2012/067569
PCT Pub. Date: May 24, 2012

(65) Prior Publication Data
US 2013/0213304 A1    Aug. 22, 2013

Related U.S. Application Data

(60) Provisional application No. 61/414,105, filed on Nov. 16, 2010.

(30) Foreign Application Priority Data

Nov. 16, 2010 (SE) ...................................... 1051197

(51) Int. Cl.
*A01J 5/00* (2006.01)
*A01J 11/06* (2006.01)
(Continued)

(52) U.S. Cl.
CPC ................ *A01J 11/06* (2013.01); *A01J 5/0134* (2013.01); *A01J 7/022* (2013.01)

(58) Field of Classification Search
CPC ........... A01J 7/022; A01J 11/06; A01J 11/08; A01J 5/0134; A01J 5/007; A01J 9/02
USPC .................................. 119/14.02, 14.14, 14.17
See application file for complete search history.

(56) References Cited

U.S. PATENT DOCUMENTS 3,915,866 A   10/1975   Brown et al.
4,385,590 A    5/1983   Mortensen
(Continued)

FOREIGN PATENT DOCUMENTS

DE   100 46 277 A1    4/2002
EP   1 046 336 A2    10/2000
(Continued)

OTHER PUBLICATIONS

International-Type Search Report, dated May 9, 2011, from corresponding PCT application.
(Continued)

*Primary Examiner* — Joshua Huson
(74) *Attorney, Agent, or Firm* — Young & Thompson

(57) ABSTRACT

A milking system includes a milking member for extracting milk from an animal, a transport line, a milk tank, a milk filter unit for filtering the milk with a first filter device and a second filter device, each including a filter container and a filter element, and a valve arrangement to convey milk through the devices, where the valve arrangement communicates with a control unit. The milking system further includes an indication device generating an indication to a user when any one of the filter elements needs to be replaced, which filter of the first and second filter device needs to be replaced, and when the filter element indicated to need to be replaced is accessible for replacement. A method for operating and cleaning the milking system is also provided.

15 Claims, 2 Drawing Sheets

(51) Int. Cl.
*A01J 5/013* (2006.01)
*A01J 7/02* (2006.01)

(56) References Cited

U.S. PATENT DOCUMENTS

| | | | |
|---|---|---|---|
| 4,873,943 A * | 10/1989 | Pulvermacher | 119/14.16 |
| 5,743,209 A * | 4/1998 | Bazin et al. | 119/14.08 |
| 5,769,025 A | 6/1998 | Van Der Lely et al. | |
| 5,957,081 A * | 9/1999 | van der Lely et al. | 119/14.09 |
| 6,619,227 B1 * | 9/2003 | Berger et al. | 119/14.08 |
| 6,742,474 B2 * | 6/2004 | van den Berg et al. | 119/14.08 |
| 2003/0168389 A1 | 9/2003 | Astle et al. | |
| 2003/0183174 A1 | 10/2003 | Oosterling et al. | |
| 2004/0031765 A1 * | 2/2004 | Bjork et al. | 210/793 |
| 2004/0123807 A1 * | 7/2004 | Bosma | 119/14.18 |
| 2010/0051519 A1 | 3/2010 | Maier-Witt et al. | |
| 2010/0206095 A1 * | 8/2010 | Yehieli | 73/863.23 |

FOREIGN PATENT DOCUMENTS

| | | |
|---|---|---|
| EP | 0 653 153 B2 | 10/2004 |
| EP | 1 559 314 B1 | 2/2007 |
| GB | 2 162 081 A | 1/1986 |
| NL | 1016817 C2 | 6/2002 |
| RU | 2015665 C1 | 7/1994 |
| WO | 02/074070 A1 | 9/2002 |

OTHER PUBLICATIONS

International Search Report, dated Mar. 28, 2012, from corresponding PCT application.
Supplementary International Search Report, dated Nov. 22, 2012, from corresponding PCT application.
V.I. Syrovatka et al., Avtomatizirovannoe oborudovanie molochnykh ferm. Moskva, Rosagropromizdat, 1989, pp. 17-24, 34-35.

* cited by examiner

MILKING SYSTEM, AND A METHOD FOR OPERATING A MILKING SYSTEM

TECHNICAL FIELD OF THE INVENTION

The present invention refers generally to a milking system for extracting milk from animals that have been milked. Specifically, the invention refers to a milking system according to the preamble of claim 1, see EP-A-1 559 314. The present invention further relates to a method for operating a milking system according to the preamble of claim 11.

BACKGROUND OF THE INVENTION AND PRIOR ART

In large milking systems a large number of milking members are connected to the same milk tank for receiving and storing the milk from the different milking members. The milk from the different milking members is conveyed to the milk tank via a transport line. All milk passes through a milk filter unit before reaching the milk tank. The filter element or elements of the milk filter unit has to be replaced regularly, typically three times a day. It is preferred to replace the filter element just before the cleaning operation so that the cleaning operation can be performed with a clean filter element not influencing the cleaning liquid in a negative way.

EP-A-1 559 314 discloses a milk filter unit for a milking system. A cleaning equipment provides a rinsing liquid and a cleaning liquid during a cleaning operation via a transport line connected to the cleaning equipment. The milk filter unit is provided on the transport line and comprises a first filter device and a second filter device, each comprising a filter container and a filter element. A valve arrangement is configured to convey the rinsing liquid and the cleaning liquid through at least one of the first filter device and the second filter device. A control unit is provided for controlling the cleaning equipment and the valve arrangement. The control unit supplies, during the cleaning operation, the rinsing liquid through the milk filter unit and the first filter device during a pre-rinsing phase, the cleaning liquid through the milk filter unit during a cleaning phase, and the rinsing liquid through the milk filter unit and the first filter device during an after-rinsing phase.

One problem with the known milking systems is that it is difficult for the user to know whether a filter element needs to be replaced or has recently been replaced. In case of two filter devices, it can be difficult to know which of the filter elements needs to be replaced or which of them has been replaced.

It is also to be noted that the filter element must not be replaced when the milk is passing through the filter element. It is also not possible to replace the filter element during the cleaning operation when the cleaning liquid is circulating in the transport line and thus through the filter element.

SUMMARY OF THE INVENTION

The object of the present invention is to overcome the problems discussed above. More specifically the present invention aims at providing a reliable means to the user to know when a filter element needs to be replaced, and which filter element needs to be replaced.

The object is achieved by the milking system initially defined, which is characterised in that the milking system comprises an indication device configured to generate an indication to a user when any one of the filter element of the first filter device and the second filter device needs to be replaced and which filter element of the first filter device and the second filter device needs to be replaced.

In one embodiment of the invention said indication also indicates to the user when the filter element to be replaced is accessible for replacement. In a further embodiment of the invention said indication also indicates to the user that the filter element has been replaced. With help of the indication device the user is better informed about the status of the filter element. The indication device increase the convenience and efficiency for the user. Undue filter replacement can be prevented. The indication device may also help to prevent the filter device from being opened during milking or during the cleaning phase.

In a further embodiment, the indication device comprises a sensor device configured to sense the value of at least one parameter related to the condition of the filter element. In a further embodiment, the parameter is at least one of time of use of the filter element, light absorption characteristics of the filter element, pressure difference over the filter element or amount of milk that has passed through the filter element. Such a parameter will indicate the amount of dirt or sediment present in the filter element and can thus be used as a measure for when the filter element needs to be replaced. In yet a further embodiment the indication device is configured to generate said indication in response to a threshold level of the value sensed by the sensor. One advantage of the sensor device is that it helps to prevent unnecessary replacement of the filter element. First at a threshold level of the mentioned value, an indication will be generated to inform the user that a filter needs to be replaced. This improves the efficiency in operating the milking system. The operational costs are also decreased.

In one embodiment, the indication device comprises a user panel in the proximity of the filter unit. The user panel may comprise a display, lamps and/or switches. One advantage of the user panel is a further improvement in convenience, efficiency and safety in operating the milking system.

In another embodiment, the milking system comprising a mechanical lock configured to permit or prevent opening of the filter container, in order to control access to the filter element contained in the filter container. In one embodiment, the indication device communicates with the mechanical lock to permit opening of the filter container when said indication indicates that the filter element is accessible for replacement. The mechanical lock can be an additional security measure to prevent accidental opening of the filter container.

In a further embodiment, the indication device communicates with the control unit to generate said indication in response to a valve position of the valve arrangement. The valve arrangement may comprise a number of valves for conveying the milk through at least one of the filter devices. The communication of the position of these valves may be an additional or alternative measure to prevent the filter elements from being replaced during milking or during the cleaning phase.

The object of the present invention is also achieved by the method for operating a milking system initially defined, which method is characterised in that the method comprises the steps of filtering milk by conveying the milk through the first filter device and/or the second filter device, and generating an indication to a user when any one of the filter element of the first filter device and the second filter device needs to be replaced and which filter element of the first filter device and the second filter device needs to be replaced.

In one embodiment said indication also indicates to the user when the filter element to be replaced is accessible for replacement. In another embodiment said indication also indicates to the user that the filter element has been replaced.

In a further embodiment the method comprises the further steps of sensing a value of at least one parameter related to the condition of the filter element, and generating said indication in response to at least the value sensed by the sensor.

One embodiment relates to the method described above, wherein the milking system also comprises a cleaning equipment connected to the transport line and configured to provide a rinsing liquid and a cleaning liquid during a cleaning operation through the transport line, and wherein the valve arrangement is also configured to convey the rinsing liquid and the cleaning liquid through at least one of the first filter device and the second filter device, wherein the method comprises the further steps of:

supplying the rinsing liquid through the milk filter unit and the first filter device during a pre-rinsing phase, supplying the cleaning liquid through the milk filter unit during a cleaning phase, and supplying the rinsing liquid through the milk filter unit during an after-rinsing phase, wherein the cleaning liquid, during the cleaning phase, is supplied through the first filter device during a minor time period of the cleaning phase and through the second filter device during a major time period of the cleaning phase.

Effective cleaning of the milking system is important to prevent contamination by microorganisms. Efficient cleaning is also important to save time and costs on resources and materials. One advantage of the method described above is that the risk for contamination by microorganisms such as viruses and bacteria in the filter container are minimised. The method also enables the advantage that any remaining cleaning liquid present in the filter container of the first filter device will be rinsed during the after-rinsing phase. Another advantage is that wetting the filter element of the first filter device prevents microorganisms from growing in the filter device.

Preferred further steps of the method are defined below.

BRIEF DESCRIPTION OF THE DRAWINGS

The present invention will now be explained more closely through the description of various embodiments and with reference to the drawings attached hereto.

DETAILED DESCRIPTION OF VARIOUS EMBODIMENTS OF THE INVENTION

Figure 1:
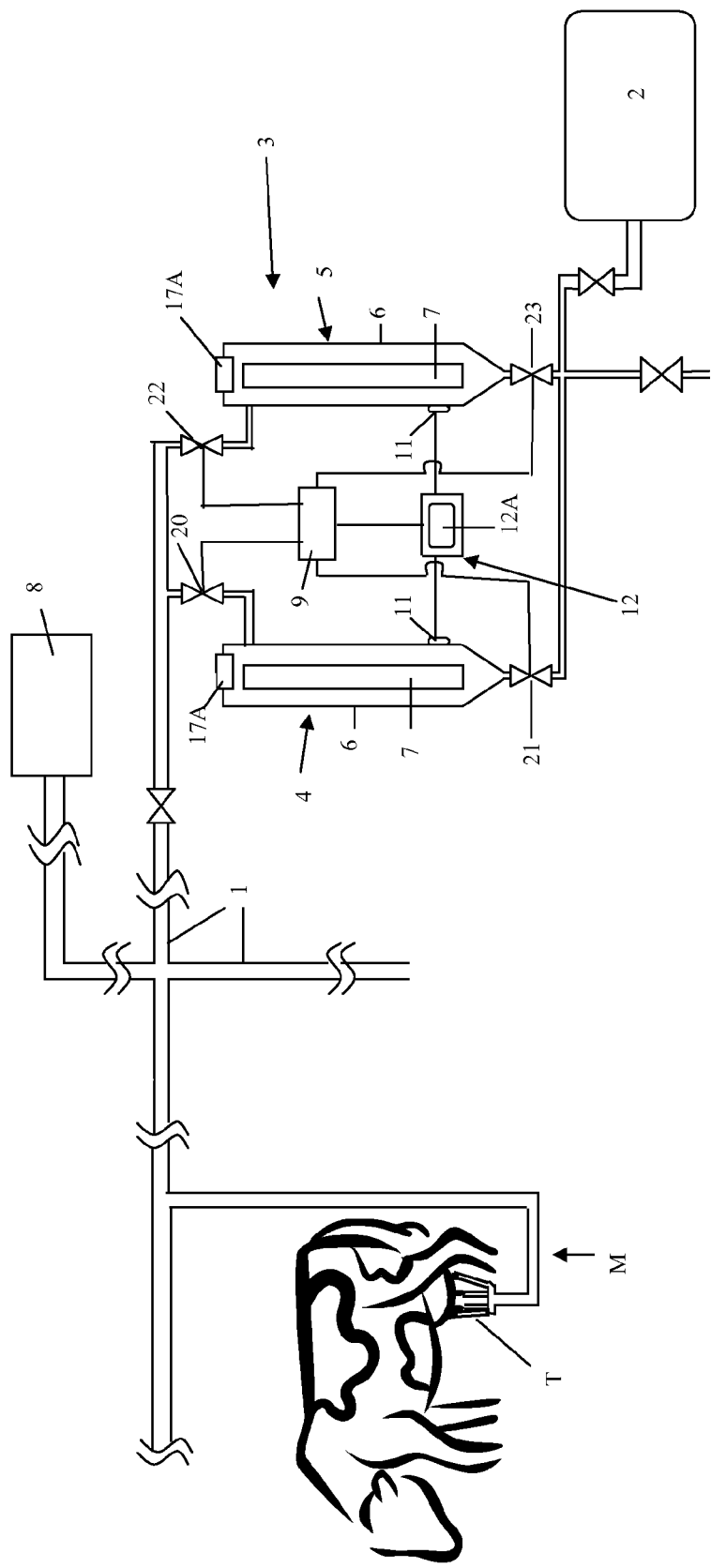
FIG. 1 discloses a schematic view of a part of a milking system with a milk filter unit.

FIG. 1 discloses a milking system with a milking member M comprising a claw and a number of teatcups T, such as four teatcups T. In the milking system a large number of milking members M may be provided for milking of animals several times a day. The milk from the milking members M is conveyed via a transport line 1 to a milk tank 2. All the milk passes a milk filter unit 3 provided to filter milk residues, dirt particles such as fibres, hairs and dung particles from the milk. The milk filter unit 3 is provided on the transport line 1 and comprises at least a first filter device 4 and a second filter device 5 as shown in FIG. 1. The first and second filter devices 4, 5 are preferably arranged in parallel to each other. Each filter device 4 comprises a filter container 6 and a filter element 7. The milk filter unit 3 may also comprise more than two filter devices, see for instance WO02/074070.

The milking system also comprises a cleaning equipment 8, which is connected to the transport line 1. The cleaning equipment 8 provides rinsing and cleaning liquids that are used for cleaning the milking system, i.e. the milking members M, the transport line 1, the filter devices 4, 5, and possible other components of the milking system.

A control unit 9 is connected to, or forms a part of, the milking system to control the flow of the milk and the rinsing and cleaning liquids. The control unit 9 preferably automatically controls a valve arrangement. With help of the valve arrangement, the control unit 9 controls the conveying of the milk and the rinsing and cleaning liquids via the transport line 1. The valve arrangement comprises individual valves arranged to open and close depending on the instructions given through the control unit 9.

The valve arrangement thus ensures that the milk and liquids flow in the desired direction through the transport line 1. With help of the valve arrangement, the pressure in the transport line 1 can be maintained. For instance, the pressure may be maintained such that the milk and liquids flow towards the milk tank 2. The valve arrangement further prevents the milk and liquids from flowing in the wrong direction, e.g. away from the milk tank 2.

The valve arrangement comprises at least four individual valves 20, 21, 22 and 23. A first upstream valve 20 of the valve arrangement may be placed on the transport line 1 before the filter container 6 of the first filter device 4. A first downstream valve 21 of the valve arrangement may be placed on the transport line 1 behind the filter container 6 of the first filter device 4. A second upstream valve 22 of the valve arrangement may be placed on the transport line 1 before the filter container 6 of the second filter device 5, and a second downstream valve 23 of the valve arrangement may be placed on the transport line 1 behind the filter container 6 of the second filter device 5. During a cleaning operation and milking, the first upstream valve 20 and first downstream valve 21 associated to the first filter device 4 may be open. At the same time, the second upstream valve 22 and the second downstream valve 23 associated to the second filter device 5 may be closed.

The valves 20, 21, 22, 23 associated with each individual filter device 4, 5 will be controlled by the control unit 9 individually and in relation to the other filter devices 4, 5 in the milk filter unit 3. The valves 20, 21, 22, 23 are preferably of a sanitary design. Any valves 20, 21, 22, 23 known to the skilled artisan may be used. For example, a three way valve or a diverted valve or an equivalent valve device can be used.

The filter elements 7 need to be replaced several times a day. The number of replacements may vary and may for example depend on the number of milking members M. In order to inform the user when a filter elements 7 is due for replacement, the milking system comprises an indication device 10. The indication device 10 may generate an indication to the user related to the status of the filter element 7 for example when any of filter elements 7 in filter devices 4, 5 needs to be replaced. The indication device 10 may also generate an indication to inform the user which filter element 7 needs to be replaced. The indication device 10 may even indicate to the user when the filter element 7 to be replaced is accessible for replacement. Or the indication device 10 may indicate to the user that the filter element 7 has been replaced.

The indication device 10 may comprise a sensor device 11. The sensor device 11 may be any device that is able to sense the condition of the filter element 7. Each of the filter devices 4, 5 may have a sensor device 11, or a single sensor device 11 may be movable between the filter devices 4, 5. This sensor device 11 is configured to sense the condition of the filter element 7 such as a value of one or more parameters related to the condition of the filter element 7. The sensor device 11 is also configured to generate an indication in response to the value of one or more parameter related to the condition of the filter element 7. The value may for example indicate the level of clogging of the filter element 7.

Figure 2:
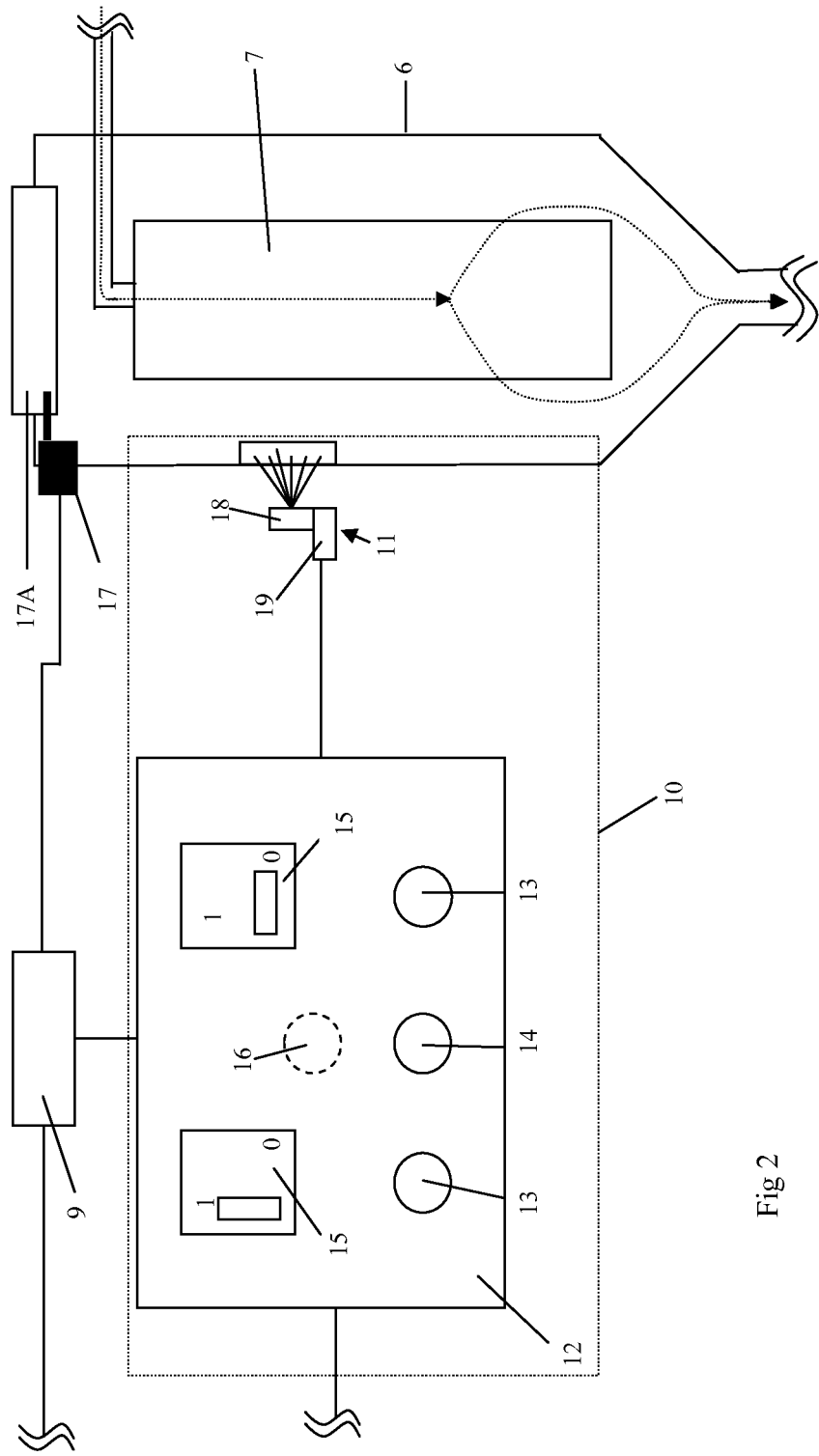
FIG. 2 discloses a schematic view of an indication device and a filter device of the milk filter unit in FIG. 1.

An example of a parameter may be light absorption characteristics of the filter element 7. The light absorption characteristics may be related to colour, transparency, reflected or scattered light. For this purpose, as shown in FIG. 2, the sensor device 11 may comprise a light source 18 that transmits a light beam towards the filter element 7. The light reflected by the filter element 7 can be sensed by a light sensor 19. The light reflected by a dirty filter will differ from the light reflected by a clean filter, for instance with respect to the colour composition. The values of the colour composition can be determined by RGB-analysis and used to communicate the value of the parameter to the indication device 10.

Another example of a parameter may be time of use of the filter element 7. This parameter may be sensed with help of a sensor comprising or being a timer (not shown). Such a timer may be included in e.g. the control unit 9.

A further parameter may be the amount of milk that has passed through the filter element 7. This parameter may be sensed with help of a sensor comprising or being a flow meter (not shown).

An alternative parameter may be pressure difference over the filter element 7. The pressure difference over the filter element increases during use of the filter element due to increased clogging of dirt in the filter element 7. This clogging obstructs the milk flow through the filter element 7, whereby a pressure develops on the receiving side of the filter element 7. The pressure may be sensed by a sensor comprising pressure gauges on each side of the filter element 7.

Threshold levels of the value for the different parameters or even different threshold levels per parameter can be determined and programmed. The indication device 10 may for example generate a signal to the user when a first threshold level has been reached to warn the user that a filter element 7 will be due for replacement within a certain period of time, e.g. 1 hour. A second threshold level will indicate that the filter element 7 needs to be replaced and yet another threshold level may indicate that a filter element 7 has been replaced. The sensor device 11 may be configured to measure one or more parameters at the same time.

The indication device 10 may generate the indication in the form of an acoustic, optical or radio signal such as for example a short message service (SMS).

The indication device 10 may comprise a user panel 12, shown more closely in FIG. 2, in the proximity of the filter unit 3. The user panel 12 may be configured to indicate the condition of the filter element 7 to a user. The user panel 12 is configured to communicate with the sensor device 11. For example, the user panel 12 may be configured to indicate when the filter element 7 needs to be replaced and which filter element 7 needs to be replaced. Alternatively, the user panel 12 may be configured to indicate that the filter element 7 is accessible for replacement. Or, the user panel 12 may be configured to indicate that the filter element 7 has been replaced. The user panel 12 may comprise a display 12A, see FIG. 1, with text informing the user about the value of one or more parameter related to the condition of the filter element 7 or when the filter element 7 was last replaced or explaining to the user what to do, etc.

The user panel 12 may also comprise at least one lamp 13 generating an optical signal. The lamp 13 can indicate to the user when the filter element 7 needs to be replaced. Alternatively, the user panel 12 may have more then one lamp, such as for instance a primary lamp 13 and a secondary lamp 14. The user panel 12 may have a primary lamp 13 and/or a secondary lamp 14 for each individual filter device 4, 5. The primary lamp 13, which may be a green lamp, can be switched on to indicate that the filter element 7 is in order. The primary lamp 13 may slowly flash to indicate that the filter element 7 is ready to be replaced. Further, the primary lamp 13 may flash faster to indicate that the filter element 7 is being replaced. The secondary lamp, which may be a red lamp, could indicate that the filter device 4 is not accessible at that moment, e.g. during cleaning or milking. During cleaning the primary lamp 13 can be turned off. The secondary lamp 14 may also be integrated into the primary lamp 13 or it may be a separate lamp. The user panel 12 may comprise one or two green lamps 13 and one red lamp 14. The red lamp 14 is lit during cleaning, while the green lamps 13 are turned off. The red lamp 14 may also be integrated into the green lamps 13. This way, both lamps 13, 14 will turn red during cleaning and milking. In another embodiment, the user panel 12 only has one red lamp 14.

The user panel 12 may further comprise one or two switches 15 in the form of turning switches, push buttons (not shown), etc. The switch or switches 15 may also be connected to the lamp 13, 14 configured to indicate to the user whether and if a filter container 6 can be opened or whether and if a filter element 7 can be replaced. For example, the switch 15 can be turned when the primary lamp 13 is slowly flashing, so that the filter element 7 can be replaced. The switch 15 can then be reset when the primary lamp 13 is flashing fast to indicate that the filter element 7 has been replaced. The user panel 12 may for example have one switch 15 and one primary lamp 13 for the first filter device 4 and another switch 15 and primary lamp 13 for the second filter device 5. The primary lamp 13 will indicate that the filter element 7 is accessible for replacement. The user panel 12 may in addition have one or two secondary lamps 14 to indicate that the filter element 7 is not accessible.

The user panel 12 may further comprise a yellow or orange lamp 16 that can be activated when a failure is discovered such as a broken lamp 13, 14, or a problem with a connection in the system or when the milking system is not working. The other lamps 13, 14 may be turned off when the yellow lamp 16 is lit, but if something hinders this, the yellow lamp 16 indicates that the signal for the other lamps 13, 14 are false.

A further timer, or the timer mentioned above, may be connected to the user panel 12. If one of the switches 15 is turned to replace the filter element 7, the timer may start running, which creates a reminder after a predetermined time, e.g. one hour, and a stop alarm at the start of the cleaning. The stop alarm may be a signal postponing the cleaning. Cleaning will be postponed until the switch 15 is back in the normal position.

For additional safety, the filter device 4, 6 may comprise a mechanical lock 17 configured to permit or prevent opening of the filter container 6. Each filter container 6 may comprise a cover 17A or any similar closing member, which is opened when the filter element 7 is to be replaced. The indication device 10 communicates with the mechanical lock 17. The filter container 6 will be allowed to be opened when said indication indicates that the filter element 7 is accessible for replacement. The mechanical lock 17 may also be connected to the control unit 9 and the user panel 12, and configured to prevent opening of the filter container 6 during cleaning or milking. For example, when the secondary lamp 14 is lit, the filter container 6 is mechanically locked, thereby preventing accidental opening of the filter container 6. When the primary lamp 13 is flashing, the lock 17 can be opened and the cover 17A removed so that the filter container 6 may be opened and the filter element 7 replaced.

Any filter element 7 known to the skilled artisan may be used. Examples of suitable filter elements 7 are cylindrical mesh elements or disc-shaped mesh elements, possibly rotating and possibly combined with a scraper. Liquids such as milk or cleaning liquid, may flow from inside of a bag-shaped filter element 7 through the filter element 7 towards the outside of the filter element 7, while dirt or sediment remains in the filter element 7. This is illustrated with the dotted lines in the filter container 6 in FIG. 2.

The indication device 10 may also communicate with the control unit 9 to generate an indication in response to a valve position of the valve arrangement. The valve arrangement may communicate with the control unit 9, which is configured to control the cleaning equipment 8 and the valve arrangement. The control unit 9 may be configured to supply the rinsing and cleaning liquids during the cleaning operation. The liquids may be supplied in various ways to the milk filter unit 3.

In one arrangement for cleaning the milk filter unit 3, the rinsing liquid is first supplied through the milk filter unit 3 and the first filter device 4 during a pre-rinsing phase. Then, the cleaning liquid is supplied through the milk filter unit 3 during a cleaning phase, and subsequently the rinsing liquid is supplied through the milk filter unit 3 and the second filter device 5 during an after-rinsing phase.

With respect to the cleaning phase, it is to be noted that the control unit 9 may be configured to supply during the cleaning phase the cleaning liquid through the first filter device 4 during a minor time period of the cleaning phase and through the second filter device 5 during a major time period of the cleaning phase. The minor time period may be defined as at the most 25% of the time used for the cleaning phase and the major time period may be defined as at least 75% of the time used for the cleaning phase. The total time needed for the cleaning phase may vary depending on for example the amount of milking members M used since the last cleaning. In another embodiment the minor time period is at the most 20% or 15% or 10% or 5% or 2% of the time used for the cleaning phase and the major time period is at least 80% or 85% or 90% or 95% or 98% of the time used for the cleaning phase. It should be noted that the minor time period during which the cleaning liquid is conveyed through the first device 4, may be set at the beginning of the cleaning phase, at the end of the cleaning phase or in the middle of the cleaning phase.

With respect to the after-rinsing phase, it is to be noted that the control unit 9 may be configured to supply the rinsing liquid, during the after-rinsing phase, through only the second filter device including the new filter element 7. However, the control unit 9 may also be configured to supply the rinsing liquid, during the after-rinsing phase, through the first filter device 4, including the old filter element 7, during an initial minor part of the after-rinsing phase, and through the second filter device 5 for a major part of the after-rinsing phase.

A milking system may be cleaned with respect to the milk filter unit 3 in many different ways. One example of a method for cleaning the milk filter unit 3 will be described, whereby, as indicated above, the filter element 7 of the first filter device 4 is old and to be replaced, and the filter element 7 of the second filter device 5 is new and to be used during the following transport of the milk to the milk tank 2. Such a method comprises the following steps of:

1) supplying the rinsing liquid through the milk filter unit 3 and the first filter device 4 during the pre-rinsing phase,
2) closing the first upstream valve 20 and the first downstream valve 21 with respect to the first filter device 4 and opening the second upstream valve 22 and the second downstream valve 23 with respect to the second filter device 5,
3) supplying the cleaning liquid through the second filter device 5 during the cleaning phase during a major time period of the cleaning phase,
4) closing the second upstream valve 22 and the second downstream valve 23 with respect to the second filter device 5, and opening the first upstream valve 20 and the first downstream valve 21 with respect to the first filter device 4,
5) supplying the cleaning liquid through the first filter device 4 during the cleaning phase during a minor time period of the cleaning phase,
6) optionally supplying a minor amount of the rinsing liquid through the milk filter unit 3 and the first filter device 4 during an initial part of the after-rinsing phase,
7) closing the first upstream valve 20 and the first downstream valve 21 with respect to the first filter device 4 and opening the second upstream valve 22 and the second downstream valve 23 with respect to the second filter device 5, and
8) supplying the rinsing liquid through the milk filter unit 3 and the second filter device 5 during the after-rinsing phase.

The steps are the same when the filter element 7 of the second filter device 5 is to be replaced but the initial rinsing liquid will then be conveyed through the second filter device 5 and so forth.

The first filter element 7 may be replaced before supplying the cleaning liquid through the milk filter unit 3 during a minor time period in the method described above.

The filter element 7 in the first filter device 4 may also be replaced, while the filter element 7 in the second filter device 5 is in use during cleaning or milking.

The present invention is not limited to the embodiments disclosed but may be varied and modified within the scope of the following claims.

The invention claimed is:

1. A milking system comprising:
a milking member (M) for extracting milk from an animal;
a transport line (1) connected to the milking member (M);
a milk tank (2) connected to the transport line (1), the milk tank receiving the milk from the milking member (M) via the transport line (1);
a milk filter unit (3) forming a part of the transport line (1), the milk filter unit (3) filtering the milk and comprising at least a first filter device (4) and a second filter device (5), each filter device (4, 5) comprising a filter container (6) and a filter element (7);
a valve arrangement configured to convey the milk through at least one of the first filter device (4) and the second filter device (5);
a control unit (9) configured to control the valve arrangement, the valve arrangement in communication with the control unit (9); and
an indication device (10) operatively connected to the control unit (9), the indication device (10) generating an indication to a user i) when any one of the filter element (7) of the first filter device (4) and the second filter device (5) needs to be replaced, ii) which filter element (7) of the first filter device (4) and the second filter device (5) needs to be replaced, and iii) when the filter element (7) indicated to need to be replaced is accessible for replacement, wherein,
each filter device (4, 5) comprises a mechanical lock (17) configured to permit and prevent opening of each filter container (6), in order to control access to the filter element (7) contained in the filter container (6), the mechanical lock (17) operatively connected to the control unit (9) and the indication device (10), and the indication device (10) communicates with the mechanical lock (17) to permit opening of the filter container (6) when said indication device (10) indicates that the filter element (7) is accessible for replacement.

2. The milking system according to claim 1, wherein said indication device (10) is further configured to generate said indication in response to a valve position of the valve arrangement.

3. The milking system according to claim 1, wherein said indication device (10) is further configured to generate a further indication to the user that the filter element (7) is not accessible for replacement.

4. The milking system according to claim 1, wherein said indication device (10) is further configured to generate an indication to the user that the filter element (7) has been replaced.

5. The milking system according to claim 1, wherein said indication device (10) comprises a sensor device (11) configured to sense a value of at least one parameter related to a condition of each filter element (7).

6. The milking system according to claim 5, wherein the parameter is at least one of i) time of use of the filter element (7), ii) light absorption characteristics of the filter element (7), iii) a pressure difference over the filter element (7), and iv) an amount of milk that has passed through the filter element (7).

7. The milking system according to claim 5, wherein the indication device (10) is configured to generate said indication in response to a threshold level of the value sensed by the sensor.

8. The milking system according to claim 1, wherein the indication device (10) comprises a user panel (12) in proximity of the filter unit (3).

9. A method for operating a milking system comprising:
operating a milking member (M) to extract milk from an animal, wherein a transport line (1) is connected to the milking member (M), a milk tank (2) connected to the transport line (1), and the milk tank receives the milk from the milking member (M) via the transport line (1);
filtering the extracted milk by operating a milk filter unit (3) forming a part of the transport line (1), the milk filter unit (3) comprising at least a first filter device (4) and a second filter device (5), each filter device (4, 5) comprising a filter container (6) and a filter element (7), with a valve arrangement configured to convey the milk through at least one of the first filter device (4) and the second filter device, the filtering milk step comprising conveying the milk through at least one of the first filter device (4) and the second filter device (5); and
through i) a control unit (9) configured to control the valve arrangement, the valve arrangement in communication with the control unit (9), and ii) an indication device (10) operatively connected to the control unit (9), operating the indication device (10) to generate an indication to a user i) when any one of the filter element (7) of the first filter device (4) and the second filter device (5) needs to be replaced, ii) which filter element (7) of the first filter device (4) and the second filter device (5) needs to be replaced, and iii) when the filter element (7) indicated to need to be replaced is accessible for replacement; and
operating the indication device (10) to communicate with a mechanical lock (17) to permit opening of the filter container (6) when said indication device (10) indicates that the filter element (7) is accessible for replacement, wherein the mechanical lock (17) is configured to permit and prevent opening of each filter container (6), in order to control access to the filter element (7) contained in the filter container (6), the mechanical lock (17) operatively connected to the control unit (9) and the indication device (10).

10. The method according to claim 9, wherein said generating an indication step includes a further indication that the filter element (7) has been replaced.

11. The method according to claim 9, wherein said generating an indication step includes a further indication that the filter element (7) is not accessible for replacement.

12. The method according to claim 9, wherein the method comprises the further steps of:
using a sensor to sense a value of at least one parameter related to a condition of the filter element (7), and
generating said indication in response to at least the value sensed by the sensor.

13. The method according to claim 9, comprising the further steps of:
operating a cleaning equipment (8) connected to the transport line (1) and configured to provide a rinsing liquid and a cleaning liquid during a cleaning operation through the transport line (1), wherein the valve arrangement is also configured to convey the rinsing liquid and the cleaning liquid through at least one of the first filter device (4) and the second filter device (5):
supplying the rinsing liquid through the milk filter unit (3) and the first filter device (4) during a pre-rinsing phase;
supplying the cleaning liquid through the milk filter unit (3) during a cleaning phase; and
supplying the rinsing liquid through the milk filter unit (3) during an after-rinsing phase,
wherein the cleaning liquid, during the cleaning phase, is supplied through the first filter device (4) during a minor time period of the cleaning phase and through the second filter device (5) during a major time period of the cleaning phase.

14. The method according to claim 13, wherein the rinsing liquid, during the after-rinsing phase, is supplied through at least the second filter device (5).

15. The method according to claim 14, wherein the rinsing liquid, during the after-rinsing phase, is supplied through the first filter device (4) for an initial minor part of the after-rinsing phase, and through the second filter device (5) for a major part of the after-rinsing phase.

* * * * *